United States Patent Office 2,910,922
Patented Nov. 3, 1959

2,910,922

COMPOSITIONS CONTAINING COAL TAR AND A POLYSULFIDE POLYMER AND PAVEMENT SEALED THEREWITH

Frederick P. Horning, Northville, Mich., assignor to Allied Materials Corporation, Oklahoma City, Okla., a corporation of Delaware No Drawing. Application August 19, 1958
Serial No. 755,865

12 Claims. (Cl. 94—18)

This application is a continuation-in-part of my application Serial No. 581,373, filed April 30, 1956 now abandoned.

The invention relates to a new composition obtained from a mixture of old ingredients and having new characteristics and properties making the composition useful for many purposes. One of the important uses for the new composition is as a joint sealer for concrete pavements which are subjected to hot blasts from jet engines. The composition of the present invention when used as a sealer for pavements on air fields withstands all deleterious effects caused by jet aircraft. Moreover, the composition may be produced at a reasonable cost and can be conveniently and economically applied to the joints in a concrete pavement.

In preparing my new compositions I use as one essential ingredient, a polysulfide liquid polymer capable of being converted to a tough rubbery elastomer. I have discovered that coal tar, although theoretically incompatible with a polysulfide liquid polymer, can nevertheless be mixed with it to produce a composition having excellent properties as a jet-resistant sealer. My invention in its broader aspects is based on my discovery of a composition comprising a polysulfide liquid polymer and coal tar which can be readily polymerized. My invention also contemplates compositions containing various ingredients in various proportions as hereinafter more fully set forth.

The polysulfide liquid polymer used in my new composition is a dimercaptan manufactured in liquid form and capable of being polymerized by suitable curatives to a tough rubber. It is a poly-functional mercaptan containing recurring disulfide linkages (—S—S—). It is sometimes represented by the formula (—R—S—S—R—)$_n$ with the understanding that commercial polysulfide liquid polymers usually contain thiol groups (—SH) but can be replaced in part, if so desired, by terminal alkyl, aryl, hydroxyl, allyl and carboxyl groups.

Polysulfide liquid polymers suitable for use in the present invention are described in a publication by Jorczak et al. of Thiokol Corporation, Trenton, New Jersey, in an article published in Industrial and Engineering Chemistry, vol. 43, page 324, February 1951. Reference is also made in said publication to U.S. patent of Patrick and Ferguson, 2,466,963, April 12, 1949 which also describes polysulfide liquid polymers which can be used in the preparation of the compositions of the present invention.

Generally speaking the polysulfide liquid polymers which can be used in preparing the compositions of the present invention are those having the formula:

HS(R—S—S—)$_n$RSH where $n$ is an integer from 3 to 100 or more and R is a radical of the type disclosed in the said publication by Jorczak, et al. Usually the radical R can be represented by the formula

—C$_2$H$_4$OCH$_2$OC$_2$H$_4$—

Preferably a polysulfide liquid polymer is selected having the above formula where $n$ is from 10 to 70. The optimum range for $n$ is from 20 to 45.

Polysulfide liquid polymers having the above mentioned formula are available with varying amounts of tri-functionality and all appear to be suitable in the preparation of the compounds of the present invention.

As an example of one specific polysulfide liquid polymer there is a commercially available product having a viscosity about 400 poises at 25° C. and a molecular weight about 4000. Its average structure is:

HS(R—S—S—)$_{23}$RSH where R is —C$_2$H$_4$OCH$_2$OC$_2$H$_4$—.

The coal tar used in my new composition is readily available as a commercial product and various grades can be used in carrying out my invention. However, it has been found desirable to use coal tar having a viscosity within a range of 20 seconds Saybolt Furol at 77° F. to 150 seconds Saybolt Furol viscosity at 210° F. The optimum range is 200 to 700 seconds Saybolt Furol viscosity at 77° F. as tested by ASTM-D-88-44. It is also possible to use a high viscosity coal tar or equivalent product if its viscosity is reduced with an aromatic base lighter fraction and, again, my invention, in its broader aspects contemplates use in the composition of coal tars of lower viscosity also. However, it has been found that the loss of the volatile fraction upon aging of the finished product has a deleterious effect on the performance of the polymerized composition and therefore it is preferable to use a coal tar which will give a final composition having properties that will remain substantially constant for many years.

In addition to the polymer and coal tar, I have found it desirable to introduce an extender or filler, preferably of an inorganic nature. Although many of the materials frequently employed as fillers in rubber chemistry may be used for this purpose, I have found that the best results are obtained with so-called hard clay. This material not only acts as an extender but it reinforces the polymerized mass. Also, it imparts to the polymerized mass the highest resistance to the action of the blast from jet engines. It must be understood, however, that the invention contemplates other fillers such as carbon black, various types of clay fillers, slate flour, silica, limestone, calcium carbonate, asbestine, etc., when used as supplements to the polymer-coal tar mixture.

My invention does not reside in the discovery of any new curing agent, and the composition may include any substance which will condense with the hydrogen of mercapto terminals and act as a curing agent. Thus in general such products may be used as are set forth in the patent to Patrick et al., 2,466,963, column 30, lines 36 to 67. I have found lead peroxide to be satisfactory. Instead of lead peroxide, one may use other metallic oxides in the presence of hexamethylenetetramine or, alternatively, one may use organic peroxides such as benzoyl peroxide, tertiary butyl hydroperoxide, tertiary butyl perbenzoate and cumene hydroperoxide.

In carrying out my invention the curing agent must be introduced into the mixture of polymer and coal tar at about the time the composition is applied to the work, since polymerization is rapid and the mixture becomes difficult to apply satisfactorily after a short time. To aid in obtaining a uniform distribution of catalyst throughout the mixture, it is preferably to make up two separate liquid components, the one containing all of the polymer and the other all of the curing agent. The amount of the ingredients are chosen so that predetermined volumes of the two components when mixed together give a final composition of the desired proportions. Preferably the proportions are such that when the two components are combined in equal volumes the desired final composition is obtained.

The amount of curing agent used may vary in accordance with the knowledge of the art in connection with polysulfide liquid polymers, but I have found it desirable to use lead peroxide in amount about one-tenth by weight of the amount of polysulfide polymer used. Lecithin is preferably added in minor amount for the purpose of reducing the viscosity, and minor amounts of accelerators, retarders and miscellaneous fillers may also be present without markedly changing the general nature of the composition of my invention. Small amounts of organic acids may be incorporated in the formulation to retard the rate of polymerization. Stearic acid in the amount of 1 to 4% of the polysulfide liquid polymer has been found to be the most effective. However, the addition of retarders has been found to have an adverse effect on the jet fuel resistance of the polymerized composition.

The following are specific examples of the invention:

Example 1

Two liquids are prepared, designated as components A and B, which when mixed in equal volumes result in the rapidly setting mixture C. The proportions are:

| | A Percent by weight | B Percent by weight | C Percent by weight |
|---|---|---|---|
| Coal Tar | 51.70 | 26.51 | 39.105 |
| Polysulfide Liquid Polymer (Molecular weight, 4,000) | | 37.78 | 18.89 |
| Clay | 43.08 | 34.47 | 38.775 |
| Lead Peroxide | 3.98 | | 1.99 |
| Lecithin | 1.24 | 1.24 | 1.24 |
| | 100.00 | 100.00 | 100.00 |

In use, components A and B are mixed in equal volumes and the mixture quickly applied to the material to be sealed before it becomes too viscous to handle, usually within one minute or less. Polymerization starts immediately upon mixing and is substantially complete within 48 hours. The polymerized composition effectively seals joints in concrete against the infiltration of moisture through repeated cycles of expansion and contraction. It is highly resistant to the deleterious effects of jet engine blast and jet fuel spillage.

In the above table the amounts of the ingredients are indicated in accordance with a particular analysis and no range has been stated. It must of course be understood that the proportions can vary considerably from the particular values set forth. The polysulfide liquid polymer is relatively costly but is essential to the invention. It should be present to the extent of at least 10%, usually not less than 15%, and desirably about 20% or more. There is no critical upper limit but there is no appreciable advantage in employing more than 30% to 40% as an upper limit. The coal tar should be present in a ratio to the polymer at least one to one, and often more, although a smaller ratio can be used when the amount of polymer is increased toward the higher percentages. The optimum ratio of coal tar to polymer is two to one, at least from an economic standpoint. The range of coal tar in the final composition is desirably between 25% and 60%, the optimum being about 40%. The clay or other filler can also be varied between 0% and about 60%. In some cases it may be desirable to use partly clay and partly other fillers.

Example 2

Two liquids are prepared as in Example 1 and designated as components $A_2$ and $B_2$. In preparing component $A_2$ 600 grams coal tar and 500 grams clay are mixed together in a mixer until the clay is thoroughly dispersed in the coal tar. Then 40 grams of lead dioxide is added and dispersed in the coal tar and clay. For component $B_2$ 300 grams of clay is dispersed in a mixture of 400 grams of polysulfide liquid polymer having a viscosity of 300 poises and 200 grams coal tar. When component A is mixed in equal volumes with component B a sealing composition is obtained of approximately 20% polysulfide liquid polymer, 40% coal tar and 40% clay. In order that this sealing composition may be effectively applied to a joint to protect against intrusion of water and other foreign materials it is usual to mix components A and B together through a mixing device and immediately extrude the mixture into the joint. The curing action is rapid. Instead of using exactly equal volumes of the two components it is satisfactory to vary them to the extent of plus or minus 10% and even greater differential in volumes may be satisfactory under some circumstances.

Example 3

Component $A_3$ is prepared by dispersing 20 grams lead dioxide and 100 grams clay in 900 grams coal tar. Component $B_3$ is prepared by mixing 200 grams polysulfide liquid polymer having a viscosity of 1100 poises with 700 grams coal tar and then 100 grams clay is dispersed in the mixture. Components $A_3$ and $B_3$ are then mixed in equal volume plus or minus 10% through a mixer and immediately extruded into the joint. Upon mixing, the components immediately convert from a fluid product to a tough rubbery solid capable of effectively sealing joints against intrusion of water and other foreign materials. This sealing composition is composed of approximately 10% polysulfide liquid polymer, 80% coal tar and 10% clay.

Example 4

Component $A_4$ consists of 150 grams asbestine, 160 grams lead dioxide and 800 grams coal tar. Component $B_4$ consists of 50 grams asbestine dispersed in 1000 grams polysulfide liquid polymer having a viscosity of 100 poises. When components A and B are mixed as in the preceding examples a tough rubbery solid capable of effectively sealing is obtained. The sealing composition consists of about 50% polysulfide liquid polymer, 40% coal tar and 10% asbestine.

Example 5

In the same manner as the preceding examples a sealing composition can be obtained composed of about 30% polysulfide liquid polymer, 40% coal tar and 30% slate flour. This composition is obtained by mixing component $A_5$ containing 400 grams slate flour, 60 grams lead dioxide and 700 grams coal tar with component $B_5$ containing 200 grams slate flour, 600 grams of polysulfide liquid polymer having a viscosity of 500 poises and 100 grams coal tar.

Example 6

Component $A_6$ consists of 200 grams ground calcium carbonate, 40 grams lead dioxide and 800 grams coal tar. Component $B_6$ consists of 200 grams ground calcium carbonate, 400 grams polysulfide liquid polymer having a viscosity of 400 poises and 400 grams coal tar. The sealing composition obtained by mixing the components in approximately equal volume is composed of 20% polysulfide liquid polymer, 60% coal tar and 20% calcium carbonate.

Example 7

Component $A_7$ contains 50 grams lead dioxide and 1000 grams coal tar. Component $B_7$ contains 500 grams polysulfide liquid polymer having a viscosity of 350 poises and 500 grams coal tar. When the two components are mixed in substantially equal volume a tough sealing composition is obtained composed of about 25% polysulfide liquid polymer and 75% coal tar.

It is to be understood that in the above examples it is within the purview of the invention to substitute for the particular fillers listed any other type fillers and extenders that are commonly used in the rubber industry for equivalent purposes. It is also understood that the curing agent need not be lead dioxide but any of the other curing agents known to be effective with the polysulfide liquid polymers as previously set forth.

It should also be noted that while the components listed above are blended in equal volumes a joint sealing composition can be prepared in accordance with the present invention in which the proportion can be 2 to 3% of component A and 97 to 98% of component B as long as the curing agent is in one component and the polysulfide liquid polymer is in the other component until the two components are mixed. For practical purposes it is simpler to prepare the separate components in such proportions that the desired final composition will be obtained when the components are mixed in substantially equal volumes.

It is to be understood that the composition of this invention is not only useful for a sealer resistant to jet fuels but may also be advantageously employed for other sealing purposes and as a quick setting, non-thermo plastic composition for general use.

What I claim as my invention is:

1. A composition comprising at least about 10% of a polysulfide liquid polymer and coal tar, said polymer containing recurring disulfide linkages (—S—S—) and being a polyfunctional mercaptan.

2. A composition according to claim 1 in which the polymer has the formula $$HS(R\text{—}S\text{—}S\text{—})_n RSH$$

where $n$ is 3 to 200.

3. A composition according to claim 2 where $n$ is 10 to 70.

4. A composition according to claim 2 where $n$ is 20 to 45.

5. A composition according to claim 2 where $n$ is about 24.

6. A composition according to claim 1 wherein the ingredients are combined into two separate liquids, one of which contains said polymer and the other contains the curing agent for said polymer.

7. A composition according to claim 6 containing also up to 60% of filler.

8. A joint sealer for pavements comprising at least about 10% of polysulfide liquid polymer and coal tar, said polymer containing recurring disulfide linkages (—S—S—) and being a polyfunctional mercaptan, said sealer being capable of effectively preventing the infiltration of water into the joints of said pavements and being adapted to withstand the high temperatures due to jet engine blasts.

9. A polymerized solid mass comprising at least about 10% of polymerized liquid polysulfide and coal tar, said polymer containing recurring disulfide linkages (—S—S—) and being a polyfunctional mercaptan, said polymerized mass being adapted to maintain joints in concrete pavements in a sealed condition and to withstand temperatures due to jet engine blasts.

10. In a pavement, the combination of adjacent pavement portions capable of relative movement under expansion and contraction, and a joint sealing composition between said portions comprising at least about 10% of polymerized liquid polysulfides, and coal tar, said polymer containing recurring disulfide linkages (—S—S—) and being a polyfunctional mercaptan.

11. A composition comprising by weight 10% to 40% of polysulfide liquid polymer, 25% to 60% of coal tar and 25% to 60% of filler, said polymer containing recurring disulfide linkages (—S—S—) and being a polyfunction mercaptan.

12. A composition comprising at least about 10% of a polysulfide liquid polymer and coal tar in a ratio to said polymer of at least two to one, said polysulfide polymer being a polyfunctional dimercaptan commercially available as a viscous liquid about 400 poises at 25° C. having a molecular weight about 4,000 and having a formula $$HS(RSS)_{23}RSH$$

where R is —$C_2H_4OCH_2OC_2H_4$—.

References Cited in the file of this patent

UNITED STATES PATENTS

| | | |
|---|---|---|
| 2,169,814 | Patrick | Aug. 15, 1939 |
| 2,282,948 | Dietzel | May 12, 1942 |
| 2,294,217 | Tengler | Aug. 25, 1942 |
| 2,347,182 | Coffman | Apr. 25, 1944 |

OTHER REFERENCES

Jorczak et al.: "Polysulfide Liquid Polymers," Ind. Eng. Chem., volume 43, No. 2, February 1951, page 325.